(12) United States Patent
Ham et al.

(10) Patent No.: US 10,444,891 B2
(45) Date of Patent: Oct. 15, 2019

(54) TOUCH PANEL AND DISPLAY DEVICE INCLUDING THE SAME

(71) Applicant: LG DISPLAY CO., LTD., Seoul (KR)

(72) Inventors: Yong-Su Ham, Seoul (KR); SuSeok Choi, Seongnam-si (KR); Taeheon Kim, Seoul (KR); YongWoo Lee, Goyang-si (KR); MyungJin Lim, Goyang-si (KR); Seulgi Choi, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 483 days.

(21) Appl. No.: 14/757,438

(22) Filed: Dec. 23, 2015

(65) Prior Publication Data

US 2016/0188082 A1    Jun. 30, 2016

(30) Foreign Application Priority Data

Dec. 29, 2014  (KR) .................. 10-2014-0192709
Dec. 11, 2015  (KR) .................. 10-2015-0176648

(51) Int. Cl.
*G06F 3/041*       (2006.01)
*G06F 3/044*       (2006.01)
*G02F 1/1333*      (2006.01)

(52) U.S. Cl.
CPC ........ *G06F 3/0416* (2013.01); *G02F 1/13338* (2013.01); *G06F 3/044* (2013.01); *G06F 3/0412* (2013.01)

(58) Field of Classification Search
CPC .... G06F 3/0414; G06F 3/0416; G06F 3/0412; G06F 3/044; G02F 1/13338

USPC .................................................. 345/173–178
See application file for complete search history.

(56) References Cited

U.S. PATENT DOCUMENTS

| | | | |
|---|---|---|---|
| 2005/0094038 A1* | 5/2005 | Choi | G02F 1/13338 349/12 |
| 2008/0055267 A1 | 3/2008 | Wu et al. | |
| 2008/0122998 A1 | 5/2008 | Lee et al. | |
| 2008/0278458 A1* | 11/2008 | Masuzawa | G02F 1/13338 345/174 |
| 2010/0060600 A1 | 3/2010 | Wang et al. | |
| 2011/0279401 A1* | 11/2011 | Hong | G06F 3/044 345/174 |
| 2012/0038583 A1* | 2/2012 | Westhues | G06F 3/0412 345/174 |

(Continued)

FOREIGN PATENT DOCUMENTS

| | | |
|---|---|---|
| CN | 1680846 A | 10/2005 |
| CN | 101216619 A | 7/2008 |

(Continued)

*Primary Examiner* — Amit Chatly
(74) *Attorney, Agent, or Firm* — Dentons US LLP

(57) ABSTRACT

Provided is a touch panel. The touch panel includes a first substrate, a second substrate, a first electrode, a second electrode, a third electrode, and a dielectric layer. The second substrate faces the first substrate. The first electrode is on one surface of the first substrate. The second electrode is spaced apart from the first electrode on a same plane as the first electrode. The third electrode is on one surface of the second substrate and overlaps the first electrode and the second electrode. The dielectric layer is between the first electrode and the third electrode and between the second electrode and the third electrode and includes an anisotropic dielectric material.

18 Claims, 15 Drawing Sheets

(56) References Cited

U.S. PATENT DOCUMENTS

| | | | |
|---|---|---|---|
| 2012/0133607 A1* | 5/2012 | Chiu | G06F 3/041 |
| | | | 345/174 |
| 2013/0194198 A1* | 8/2013 | Guard | G06F 3/044 |
| | | | 345/173 |
| 2014/0253858 A1* | 9/2014 | Kawano | G02F 1/134336 |
| | | | 349/143 |

FOREIGN PATENT DOCUMENTS

| | | |
|---|---|---|
| CN | 101276091 A | 10/2008 |
| CN | 101666931 A | 3/2010 |

* cited by examiner

| 285 | 270 | 271 | 271 | 285 | 270 | 276 |
|-----|-----|-----|-----|-----|-----|-----|
| 275 | 261 | 267 | 267 | 275 | 275 | 281 |
| 284 | 276 | 361 | 343 | 311 | 270 | 261 |
| 273 | 281 | 329 | 531 | 301 | 262 | 267 |
| 270 | 261 | 371 | 380 | 265 | 267 | 285 |
| 268 | 261 | 284 | 261 | 285 | 279 | 275 |
| 270 | 267 | 280 | 267 | 275 | 268 | 276 |

FIG. 5A

| 275 | 281 | 271 | 285 | 270 | 280 | 296 |
|-----|-----|-----|-----|-----|-----|-----|
| 286 | 277 | 267 | 275 | 261 | 273 | 281 |
| 284 | 276 | 341 | 351 | 334 | 270 | 261 |
| 280 | 281 | 316 | 522 | 346 | 262 | 267 |
| 279 | 280 | 306 | 353 | 281 | 271 | 285 |
| 268 | 284 | 270 | 261 | 265 | 267 | 275 |
| 270 | 276 | 262 | 267 | 262 | 272 | 276 |

FIG. 5B

TOUCH PANEL AND DISPLAY DEVICE INCLUDING THE SAME

CROSS-REFERENCE TO RELATED APPLICATIONS

This application claims the priority of Korean Patent Application No. 10-2014-0192709 filed on Dec. 29, 2014, and Korean Patent Application No. 10-2015-0176648 filed on Dec. 11, 2015, in the Korean Intellectual Property Office, the disclosures of which are incorporated herein by reference for all purposes.

BACKGROUND

Field of the Invention

The present disclosure relates to a touch panel and a display device including the same. More particularly, the present disclosure relates to a touch panel capable of sensing 2D coordinates of a touch input and touch input force and a display device including the same.

Description of the Related Art

Touch panels as a device sensing a touch input of a user, such as a screen touch on a display device or a gesture, have been widely used in large-sized display devices such as display devices of public facilities and smart TVs in addition to portable display devices including a smart phone, a tablet PC, and the like. The touch panels can be classified into a resistive type, a capacitive type, an optical type, an electromagnetic (EM) type, and the like.

Among various touch panels, a capacitive type touch panel is generally used. In the capacitive type touch panel, when capacitances of touch electrodes that cross each other are changed, a point where the touch is input is detected by measuring an amount of change in capacitances.

However, since the capacitive type touch panel is a type that detects X and Y coordinates of the point where the touch is input, 2D touch sensing is available, but the touch input force cannot be measured. Therefore, the capacitance type touch panel is disadvantageous in that a 3D touch sensing to distinguish between a weak touch input and a strong touch input is unavailable.

In recent years, a touch panel type that measures the touch input force by using a pressure sensor has been used for the 3D touch sensing. The pressure sensor that measures the touch input force includes an optical type pressure sensor, a capacitive type pressure sensor, and the like.

The optical type pressure sensor senses a pressure by using a phenomenon in which a wave guide path of light is changed on a touch surface of a finger during the touch input of a user. However, since the optical type pressure sensor needs an additional wave guide, there is a problem in that the thickness of the touch panel increases.

The capacitive type pressure sensor measures the pressure based on the amount of change in capacitance depending on a change in thickness of an insulating layer interposed between two electrodes facing each other and made of an elastic body. However, the capacitive type pressure sensor is disadvantageous in that it cannot measure the force of touch pressure for a restoration time when the insulating layer is compressed and thereafter, restored again. Further, since the insulating layer of the capacitive type pressure sensor needs to have large thickness so as to sufficiently sense the pressure, it is disadvantageous in that the thickness of the touch panel increases. The problems which occur in the capacitive type pressure sensor will be described in more detail with reference to FIG. 1.

FIG. 1 is a schematic cross-sectional view describing a problem of a touch panel in related art, which includes a capacitive type pressure sensor. Referring to FIG. 1, a touch panel 100 includes a lower substrate 110, a lower electrode 120, an insulating layer 130, an upper electrode 140, and an upper substrate 160. The lower electrode 120 and the upper electrode 140 cross each other and are electrically separated from each other with the insulating layer 130 interposed therebetween. When the insulating layer 130 is transformed, the insulating layer 130 is made of the elastic body having restoring force against the transformation.

As illustrated in FIG. 1, when a pressure is applied from the top by the touch input, local transformation of the upper substrate 160 occurs and a gap between the upper electrode 140 and the lower electrode 120 is changed by the pressure. For example, as illustrated in FIG. 1, when the touch input is applied to areas where a first lower electrode 121, a second lower electrode 122, and a third lower electrode 123 are disposed, a size of gap between the second lower electrode 122 and the upper electrode 140 just below the point to which the touch input is applied decreases. As a result, a capacitance $C_2$ between the second lower electrode 122 and the upper electrode 140 increases.

In detail, a capacitance between both electrodes facing each other is in proportion to a relative permittivity between both electrodes and in inverse proportion to a gap between both electrodes. Therefore, when the size of gap between the upper electrode 140 and the second lower electrode 122 decreases, the capacitance $C_2$ between the upper electrode 140 and the second lower electrode 122 increases.

A touch controller of the touch panel 100 detects force of the touch input by measuring an amount of change of the capacitance $C_2$ between the upper electrode 140 and the second lower electrode 122. When the touch input ends, the upper electrode 140 and the upper substrate 150 are restored to an original shape due to the restoring force of the insulating layer 130 and the capacitance $C_2$ at the point to which the touch input is applied is also restored to an initial value.

However, when the touch input is strongly applied, the insulating layer 130 is much compressed, and as a result, a significant time to restore the insulating layer 130 to an original state may be required. In this case, while the insulating layer 130 is restored, even though a new touch input is applied to a restoration point, force of the new touch input may not be accurately measured.

Further, the gap between the upper electrode 140 and the lower electrode 120 requires a sufficient change in width so as to distinguish between a touch input having a small pressure and a touch input having a large pressure. As a result, the thickness of the insulating layer 130 needs to be sufficiently large so as to sufficiently increase the gap between the upper electrode 140 and the lower electrode 120. However, since as the thickness of the insulating layer 130 increases, the thickness of the touch panel 100 cannot but increase, there is a problem in that the thickness of the display device including the touch panel 100 also increases.

SUMMARY

An object to be achieved by the present disclosure is to provide a touch panel capable of sensing a 3D touch input and providing various touch interfaces to a user and a display device including the same.

According to an aspect of the present disclosure, there is provided a touch panel including a first substrate, a second substrate, a first electrode, a second electrode, a third electrode, and a dielectric layer. The second substrate faces the first substrate. The first electrode is on one surface of the first substrate. The second electrode is disposed to be spaced apart from the first electrode on the same plane as the first electrode. The third electrode is on one surface of the second substrate and disposed to overlap with the first electrode and the second electrode. The dielectric layer is disposed between the first electrode and the third electrode and between the second electrode and the third electrode and includes an anisotropic dielectric material. Herein, the anisotropic dielectric material may have a non-cubic crystal structure. Herein, the anisotropic dielectric material may be a liquid crystal. In addition, a difference between a maximum relative permittivity and a minimum relative permittivity of the liquid crystal may be 2 or more.

According to another aspect of the present disclosure, there is provided a display device including a display panel; a touch panel; and a touch controller. The touch panel is disposed on the display panel and includes a lower electrode, a dielectric layer, and an upper electrode. The dielectric layer is disposed on the lower electrode and made of an anisotropic dielectric material. The upper electrode is disposed on the dielectric layer, overlaps with the lower electrode, and includes a first electrode and a second electrode which are disposed to be spaced apart from each other.

Detailed content of other exemplary embodiments are included in the description and drawings.

According to the present disclosure, coordinates of a touch input and force of the touch input can be detected by using a touch panel including a dielectric layer having an anisotropic dielectric material and a 3D touch input can be sensed.

Further, according to the present disclosure, the touch input can be accurately sensed regardless of a change in thickness of the dielectric layer by using the touch panel including the anisotropic dielectric material having different relative permittivities according to an arrangement direction. Thus, all forces of consecutive touch inputs can be accurately measured and a touch panel having a small thickness is provided.

The effects of the present disclosure are not limited to the aforementioned effects, and other various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 5A and 5B are schematic views comparing and describing X-Y-axis touch sensitivities of a general capacitive type touch panel and the touch panel according to the exemplary embodiment of the present disclosure;

DETAILED DESCRIPTION OF THE ILLUSTRATED EMBODIMENTS

Figure 1:
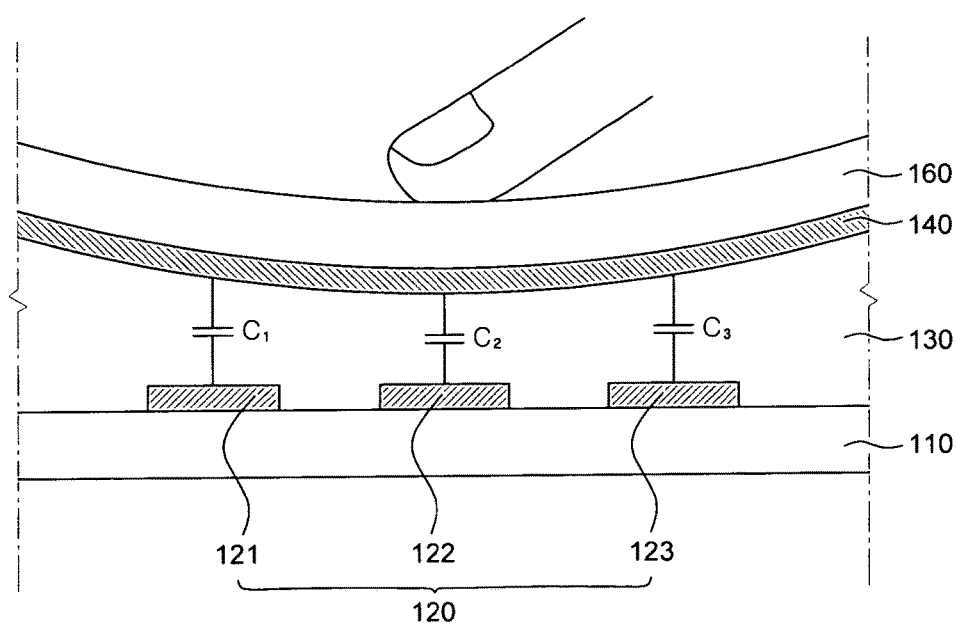
FIG. 1 is a schematic cross-sectional view describing a problem of a touch panel in the related art, which includes a capacitive type pressure sensor.

The advantages and features of the present disclosure, and methods of accomplishing these will become obvious with reference to examples to be described below in detail along with the accompanying drawings. However, the present disclosure is not limited to the exemplary embodiments set forth below, and may be embodied in various other forms. The present exemplary embodiments are for rendering the description of the present disclosure complete and are set forth to provide a complete understanding of the scope of the disclosure to a person with ordinary skill in the technical field to which the present disclosure pertains, and the present disclosure will only be defined by the scope of the claims.

Since shapes, sizes, rates, angles, the number, and the like disclosed in drawings for describing exemplary embodiment of the present disclosure are exemplary, the present disclosure is not limited to illustrated matters. Like reference numerals indicate like elements throughout the specification. Further, in the description of the present disclosure, the detailed descriptions of known related constitutions or functions thereof may be omitted if they make the gist of the present disclosure unclear. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly" is not used.

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Throughout the whole specification, the same reference numerals denote the same elements.

Since size and thickness of each component illustrated in the drawings are represented for convenience in explanation, the present disclosure is not necessarily limited to the illustrated size and thickness of each component.

The features of various embodiments of the present disclosure can be partially or entirely bonded to or combined with each other and can be interlocked and operated in technically various ways as can be fully understood by a person having ordinary skill in the art, and the embodiments can be carried out independently of or in association with each other.

Hereinafter, various exemplary embodiments of the present disclosure will be described in detail with reference to the accompanying drawings.

Figure 2A:
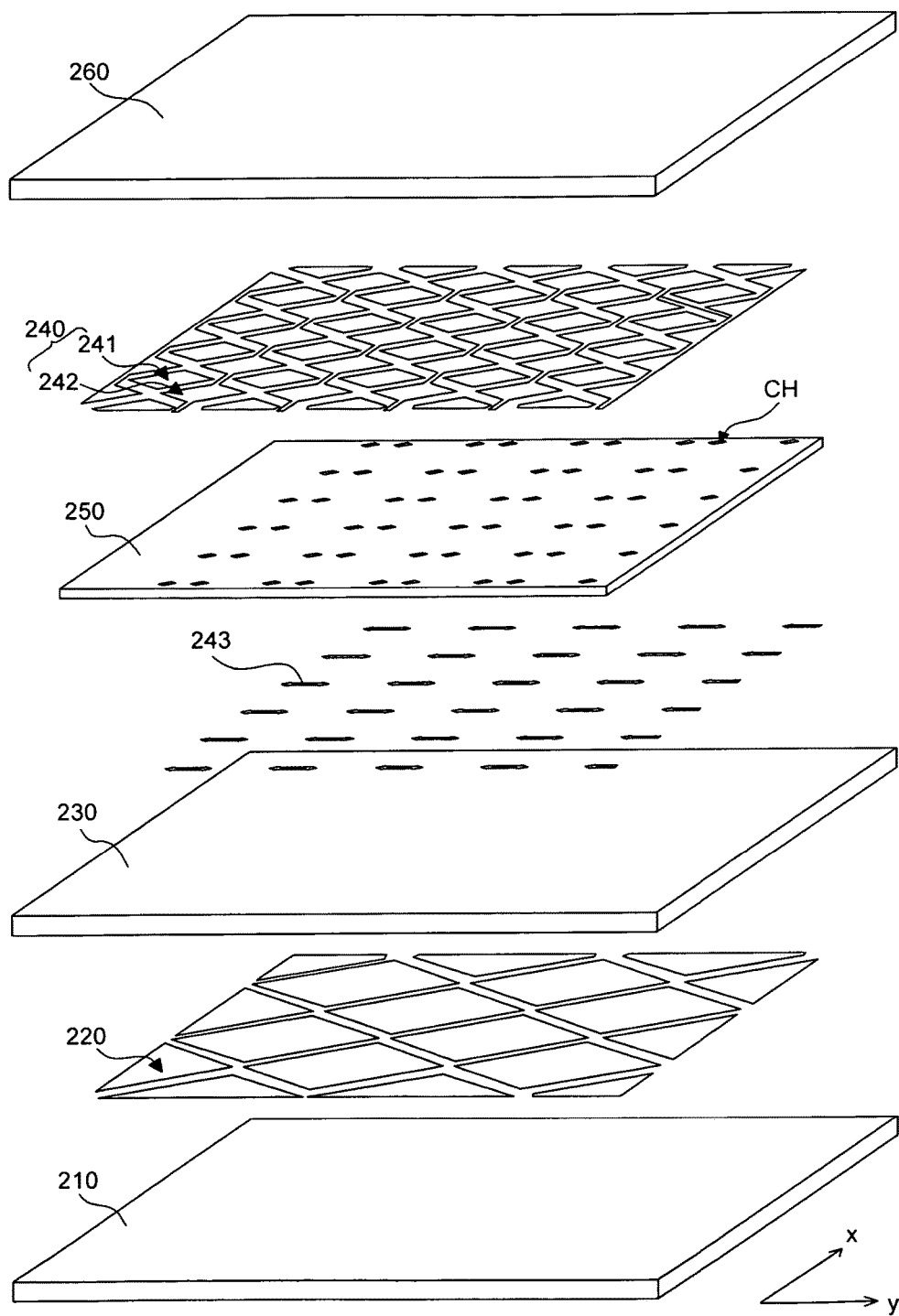
FIG. 2A is a schematic exploded perspective view describing a touch panel according to an exemplary embodiment of the present disclosure.
Figure 2B:
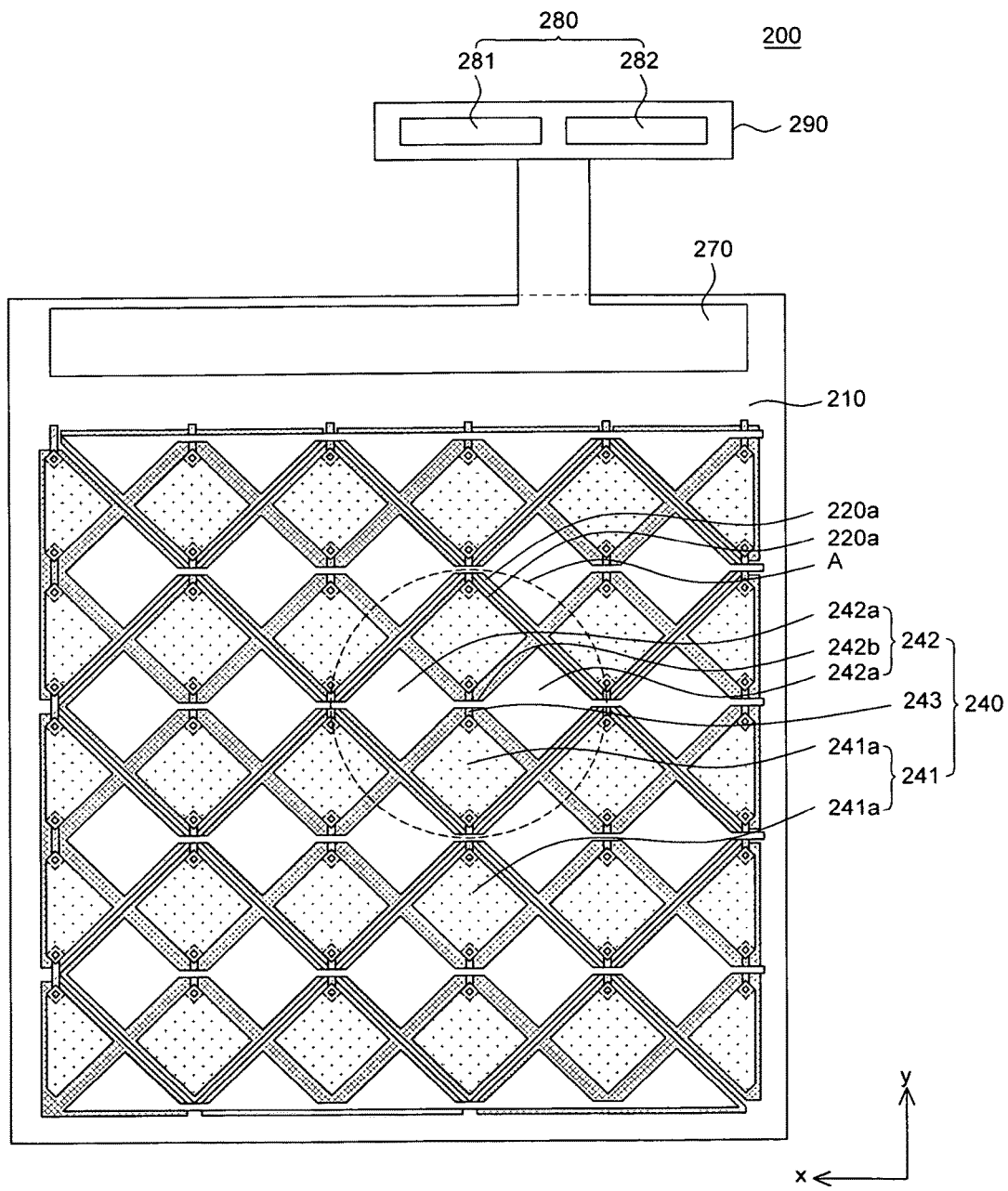
FIG. 2B is a schematic plan view of the touch panel of FIG. 2A.
Figure 2C:
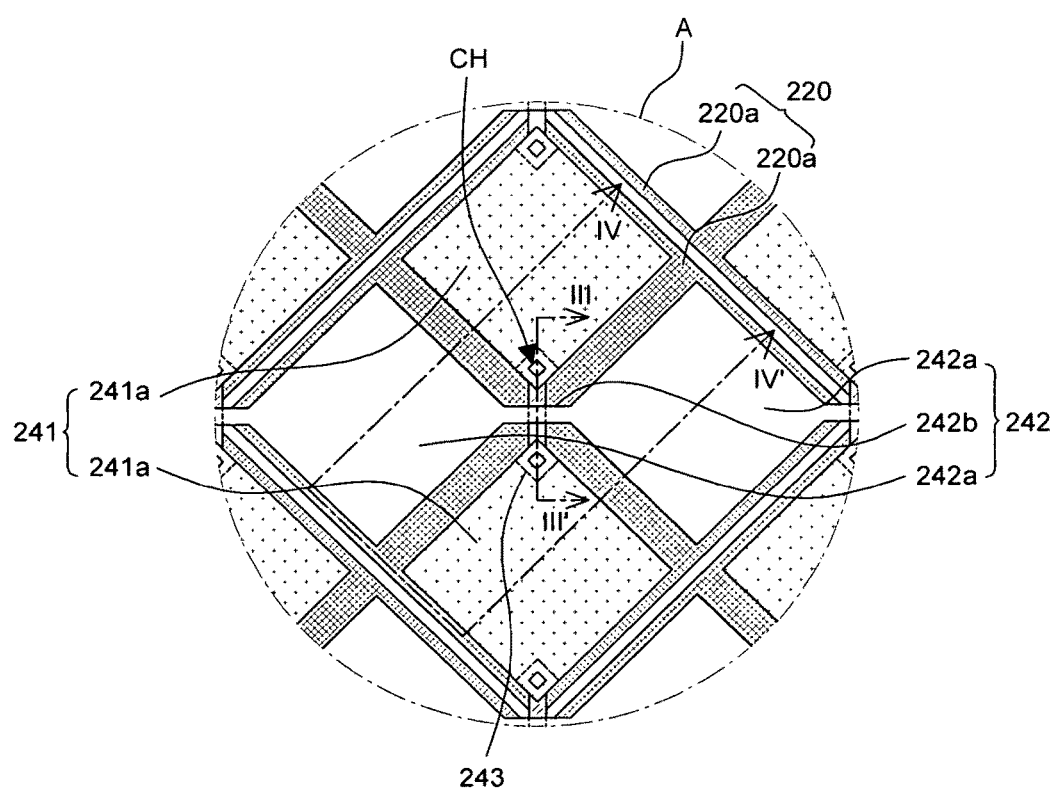
FIG. 2C is a partial enlarged plan view of area A of FIG. 2B.
Figure 3:
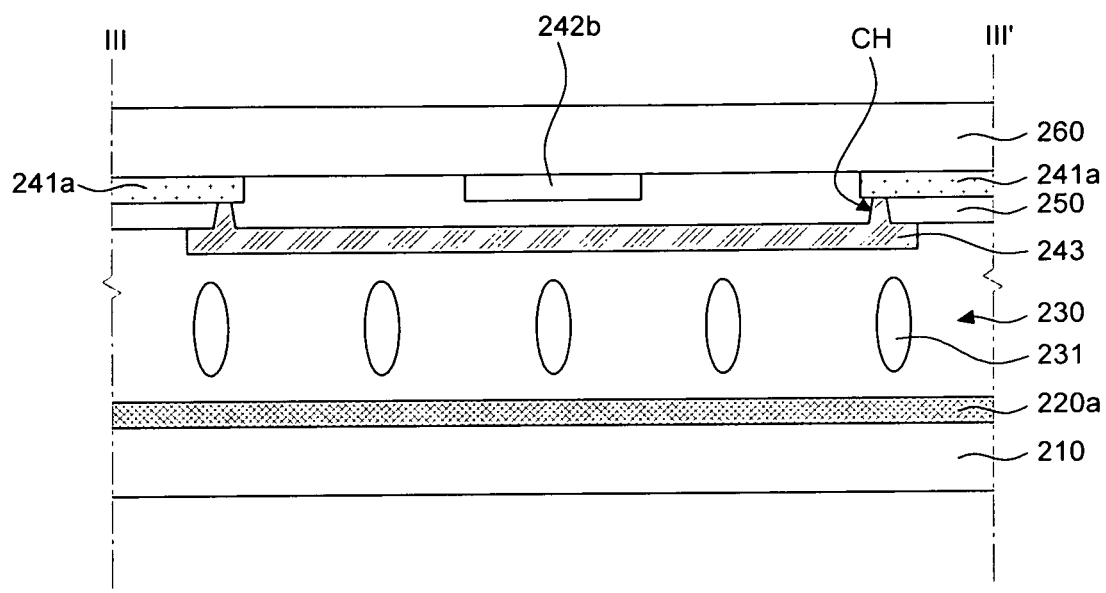
FIG. 3 is a schematic cross-sectional view of the touch panel taken along line III-III' of FIG. 2C.

FIG. 2A is a schematic exploded perspective view describing a touch panel according to an exemplary embodiment of the present disclosure. FIG. 2B is a schematic plan view of the touch panel of FIG. 2A. FIG. 2C is a partial enlarged plan view of area A of FIG. 2B. FIG. 3 is a schematic cross-sectional view of the touch panel taken along line III-III' of FIG. 2C. In FIGS. 2B and 2C, an upper substrate 260 is not illustrated, and in FIGS. 2A and 3, a touch printed circuit board 270 and a touch controller 280 are not illustrated. Referring to FIG. 2A, a touch panel 200 includes a lower substrate 210, a lower electrode 220, a dielectric layer 230, an upper electrode 240, and an upper substrate 260.

The lower substrate 210 is a substrate for supporting the lower electrode 220 and the upper substrate 260 is a substrate for supporting the upper electrode 240. The lower substrate 210 and the upper substrate 260 face each other. Each of the lower substrate 210 and the upper substrate 260 may be made of glass having excellent rigidity and excellent transmittance or plastic having flexibility.

The upper electrode 240 is disposed on one surface of the upper substrate 260 and in more detail, the upper electrode 240 is disposed on a surface facing the lower substrate 210. The upper electrode 240 includes a first electrode 241 and a second electrode 242. The first electrode 241 and the second electrode 242 are spaced apart from each other and disposed on the same plane.

The first electrode 241 and the second electrode 242 are made of a conductive material. When the touch panel 200 is applied to a display device, the first electrode 241 and the second electrode 242 may be made of transparent conductive oxide (TCO) in order to suppress visibility of the display device from being deteriorated due to the first electrode 241 and the second electrode 242. The TCO may include such as indium tin oxide (ITO), indium zinc oxide (IZO), and the like. Further, the first electrode 241 and the second electrode 242 may be made of Ag nano wire, carbon nano tube (CNT), or graphene having excellent transmittance and excellent electric conductivity. According to some exemplary embodiments, the first electrode 241 and the second electrode 242 may be constituted by a mesh type metal line. In this case, the width of the metal line is small, and as a result, the first electrode 241 and the second electrode 242 may have transparency on the whole.

The first electrode 241 and the second electrode 242 are electrodes for sensing 2D coordinates of a touch input of the touch panel 200. The first electrode 241 and the second electrode 242 extend in different directions so as to sense the 2D coordinates. That is, the first electrode 241 extends in a first direction and the second electrode 242 extends in a second direction different from the first direction. The first electrode 241 and the second electrode 242 cross each other to be disposed in a matrix pattern. For example, the first electrode 241 extends in a Y-axis direction and the second electrode 242 extends in an X-axis direction. Therefore, the 2D coordinates of the touch input may be sensed based on a change of an electric field between the first electrode 241 and the second electrode 242. In detail, a Y coordinate of the touch input may be sensed by the first electrode 241 and an X coordinate of the touch input may be sensed by the second electrode 242.

In FIG. 2A, the Y-axis direction is represented as a horizontal direction and the X-axis direction is represented as a vertical direction. On the contrary, in FIG. 2B, the Y-axis direction is represented as the vertical direction and the X-axis direction is represented as the horizontal direction.

An overcoat layer 250 is disposed below the upper electrode 240. The overcoat layer 250 covers a lower surface of the upper electrode 240 so that a first connection electrode 243 is electrically separated from the second electrode 242 of the upper electrode 240. The overcoat layer 250 includes a plurality of contact holes CH so that the first connection electrode 243 is electrically connected with the first electrode 241. The first connection electrode 243 is connected with first sub electrodes of the first electrode of the upper electrode 240 and disposed below the overcoat layer 250. Detailed description of the first connection electrode 243 will be made below.

The dielectric layer 230 is disposed between the upper substrate 260 and the lower substrate 210 and in more detail, the dielectric layer 230 is disposed between the upper electrode 240 and the lower electrode 220. For example, the dielectric layer 230 is disposed below the first connection electrode 243 and electrically separates the upper electrode 240 and the lower electrode 220 from each other.

The lower electrode 220 is disposed on one surface of the lower substrate 210. In more detail, the lower electrode 220 is disposed on a surface facing the upper substrate 260 and is disposed to overlap with the first electrode 241 and the second electrode 242. The lower electrode 220 is made of the conductive material. Further, the lower electrode 220 may be made of the same material as the upper electrode 240. For example, the lower electrode 220 may be made of the transparent conductive oxide such as ITO, IZO, or the like or made of Ag nano wire, carbon nano tube, or graphene having excellent transmittance and excellent electrical conductivity.

The lower electrode 220 constitutes a capacitor together with the upper electrode 240 with the dielectric layer 230 interposed therebetween. Further, force of the touch input may be measured based on an amount of change in capacitance between the upper electrode 240 and the lower electrode 220. Detailed description thereof will be made below with reference to FIGS. 4A to 4D.

Referring to FIGS. 2B, 2C and 3, each of the first electrode 241 of the upper electrode 240 and the second electrode 242 of the upper electrode 240 includes a plurality of sub electrodes. That is, the first electrode 241 includes a plurality of first sub electrodes 241a and the second electrode 242 includes a plurality of second sub electrodes 242a.

Each of the first sub electrode 241a and the second sub electrode 242a has an electrode surface having a specific shape. For example, as illustrated in FIGS. 2A and 2B, each of the first electrode 241 and the second electrode 242 includes the plurality of first sub electrodes 241a and the plurality of second sub electrodes 242a having an electrode surface with a diamond shape. However, the present disclosure is not limited thereto and the electrode surfaces of the first sub electrode 241a and the second sub electrode 242a may be configured to have various shapes including a polygonal shape, a circular shape, or an oval shape.

As illustrated in FIG. 2B, the plurality of second sub electrodes 242a are connected to each other. For example, as illustrated in FIG. 2C, the second sub electrodes 242a are connected to each other through the second connection electrode 242b which extends from one corner of the second sub electrode 242a and is disposed on the same plane as the second sub electrode 242a. That is, the second sub electrode 242a and the second connection electrode 242b are integrally formed, and as a result, the second electrode 242 is formed.

As illustrated in FIG. 2C, the plurality of first sub electrodes 241a are electrically connected to each other through the first connection electrode 243 disposed on a different plane from the first sub electrode 241a. In detail, as illustrated in FIG. 3, the overcoat layer 250 made of an insulating material is disposed below the upper substrate 260 so as to cover the first electrode 241 and the second electrode 242. Further, the first connection electrode 243 electrically connects the plurality of first sub electrodes 241a through the contact hole CH formed on the overcoat layer 250. In this case, the first connection electrode 243 may be electrically separated from the second connection electrode 242b of the second electrode 242 through the overcoat layer 250. Therefore, the first electrode 241 and the second electrode 242 may cross each other while being electrically separated from each other.

The lower electrode 220 includes a plurality of pattern electrodes 220a. The plurality of pattern electrodes 220a overlap with at least one first sub electrode 241a among the plurality of first sub electrodes 241a constituting the first electrode 241 and overlap with at least one second sub electrode 242a among the plurality of second sub electrodes 242a constituting the second electrode 242. For example, as illustrated in FIG. 2C, the pattern electrode 220a of the lower electrode 220 overlaps with two first sub electrodes 241a and two second sub electrodes 242a. The first sub electrode 241a and the second sub electrode 242a that overlap with the pattern electrode 220a are positioned in line with each other. That is, the pattern electrode 220a overlaps with two consecutive first sub electrodes 241a and two second sub electrodes 242a in line with the first sub electrodes 241a.

The pattern electrode 220a of the lower electrode 220 has an electrode surface having a specific shape. For example, as illustrated in FIGS. 2B and 2C, the pattern electrode 220a has the electrode surface having a diamond shape. However, the present disclosure is not limited thereto and the electrode surface of the pattern electrode 220a may be configured to have various shapes including the polygonal shape, the circular shape, or the oval shape. The electrode surface of the pattern electrode 220a may have an area corresponding to one finger knuckle of a person. For example, the electrode surface of the pattern electrode 220a may have an area of 2 cm×2 cm.

Although the electrode disposed below the upper substrate 260 is designated as the upper electrode 240 and the electrode disposed above the lower substrate 210 is designated as the lower electrode 220 in the specification, the locations of the upper electrode 240 and the lower electrode 220 may be changed with each other. That is, the first electrode 241 and the second electrode 242 for sensing the coordinates of the touch input may be disposed on the lower substrate 210 and the lower electrode 220 for measuring the force of the touch input may be disposed below the upper substrate 260.

In FIG. 2B, the touch controller 280, as a component for sensing the touch input, includes a touch coordinate detecting unit 281 configured to detect the coordinate of the touch input and a touch force detecting unit 282 configured to detect the force of the touch input. The touch controller 280 may be configured to include an analog-digital converter converting a touch signal received from the upper electrode 240 and the lower electrode 220 into a digital signal, a micro controller unit (MCU) for calculating the coordinate of the touch input and the force of the touch input based on the touch signal, a memory, and the like. However, a configuration of the touch controller 280 is not limited thereto. In some exemplary embodiments, the touch coordinate detecting unit 281 and the touch force detecting unit 282 may be constituted by one micro controller unit.

The touch controller 280 is disposed on the printed circuit board 290. When the touch panel 200 is applied to the display device, the printed circuit board 290 may be a printed circuit board of the display device in which various controllers of the display device are disposed.

A flexible printed circuit board 270 is a substrate for transferring signals between the touch controller 280 and the upper electrode 240 and the lower electrode 220. For example, the flexible printed circuit board 270 transfers the touch signals of the upper electrode 240 and the lower electrode 220 to the touch controller 280.

The touch controller 280 applies a first voltage to the first electrode 241 and a second voltage to the second electrode 242. The first voltage and the second voltage are different from each other, and as a result, the electric field is formed between the first electrode 241 and the second electrode 242. When the touch input is applied, the electric field between the first electrode 241 and the second electrode 242 is changed and the touch controller 280 senses the coordinates of the touch input, that is, the X coordinate and the Y coordinate of the touch input through the change of the electric field. Detailed description regarding that the touch panel 100 senses the coordinates of the touch input will be made below with reference to FIGS. 4A to 4D.

Further, the touch controller 280 applies a third voltage to the lower electrode 220. The third voltage may be different from the first voltage applied to the first electrode 241. Since the first voltage and the third voltage are different from each other, the electric field is generated between the first electrode 241 and the lower electrode 220. The touch controller 280 measures the force of the touch input based on the change in capacitance between the lower electrode 220 and the first electrode 241 of the upper electrode 240. Detailed description regarding that the touch panel 100 measures the force of the touch input will be made below with reference to FIGS. 4A to 4D.

Referring to FIG. 3, the dielectric layer 230 is disposed between the upper substrate 260 and the lower substrate 210 and in more detail, the dielectric layer 230 is disposed between the upper electrode 240 and the lower electrode 220. The dielectric layer 230 has an anisotropic dielectric material 231 having relative permittivity which varies depending on an arrangement direction. Herein, the relative permittivity means a ratio of a permittivity of a medium and a permittivity of vacuum and is also referred to as a dielectric constant. As the anisotropic dielectric material 231, dioxide titanium (TiO2), a liquid crystal, or the like having a non-cubic crystal structure. In FIG. 3, an exemplary embodiment in which the dielectric layer 230 includes the liquid crystal 231. However, the anisotropic dielectric material 231 of the touch panel 200 according to the exemplary embodiment of the present disclosure need not particularly be the liquid crystal and all anisotropic dielectric materials having the non-cubic crystal structure may be used. Hereinafter, a case in which the dielectric layer 230 includes the liquid crystal 231 will be described for easy description.

When the arrangement direction of the liquid crystal 231 of the dielectric layer 230 is changed, the relative permittivity of the dielectric layer 230 may be changed, and as a result, the capacitance between the upper electrode 240 and the lower electrode 220 may be changed. The touch panel 200 according to the exemplary embodiment of the present disclosure measures the force of the touch input based on the capacitance between the upper electrode 240 and the lower electrode 220, which is changed as the arrangement direction of the liquid crystal 231 is changed. More detailed description thereof will be made with reference to FIGS. 4A to 4D.

Figure 4A:
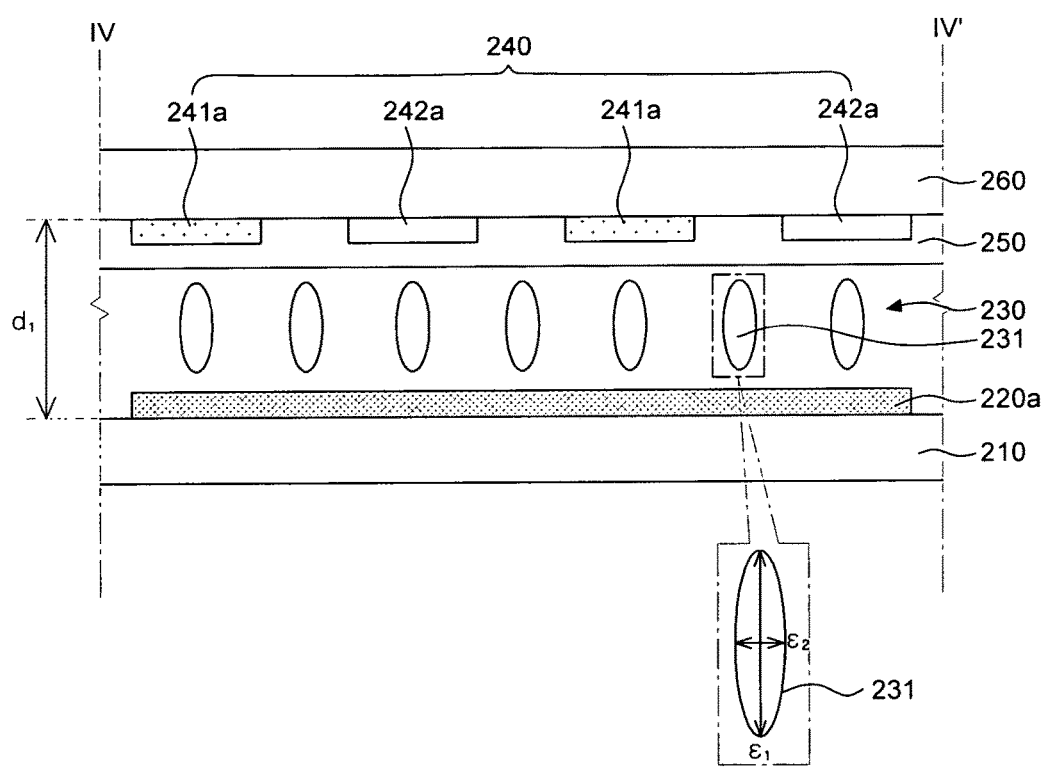
FIG. 4A is a schematic cross-sectional view of the touch panel taken along line IV-IV' of FIG. 2C.
Figure 4B:
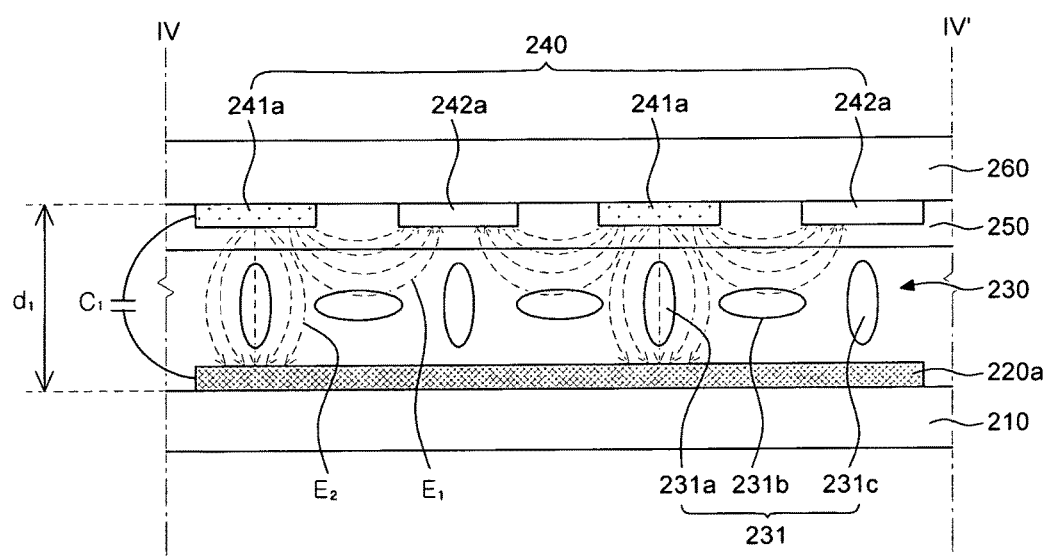
FIG. 4B is a schematic cross-sectional view of the touch panel describing an arrangement direction of an anisotropic dielectric material when driving voltage is applied.
Figure 4C:
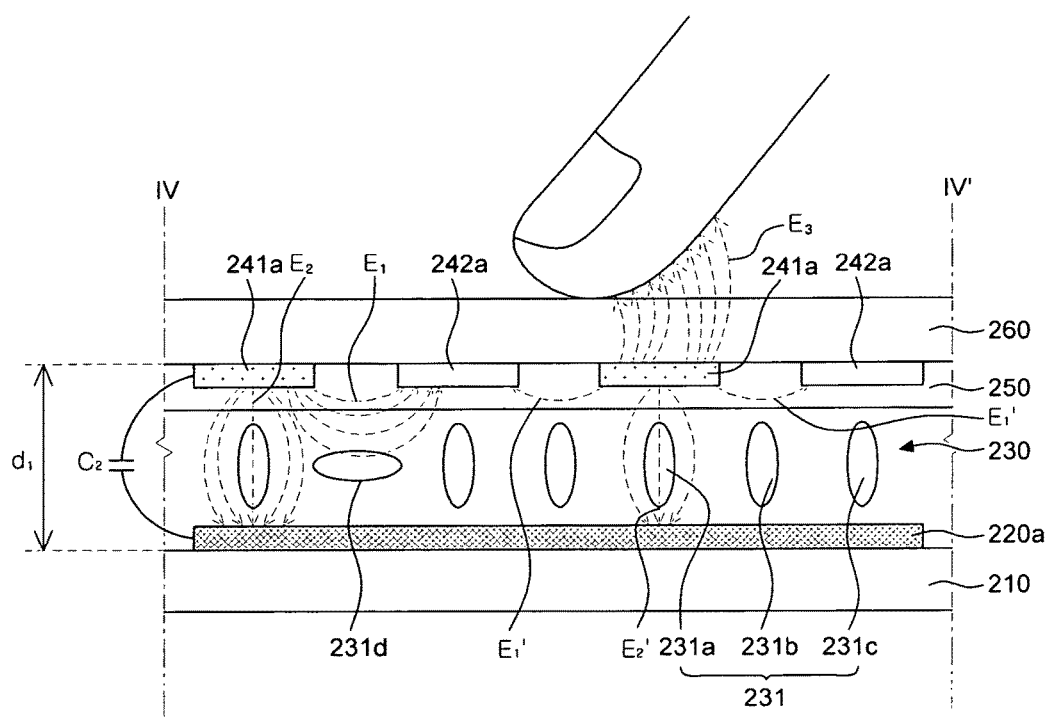
FIG. 4C is a schematic cross-sectional view of the touch panel describing the arrangement direction of the anisotropic dielectric material when a weak touch input is applied.
Figure 4D:
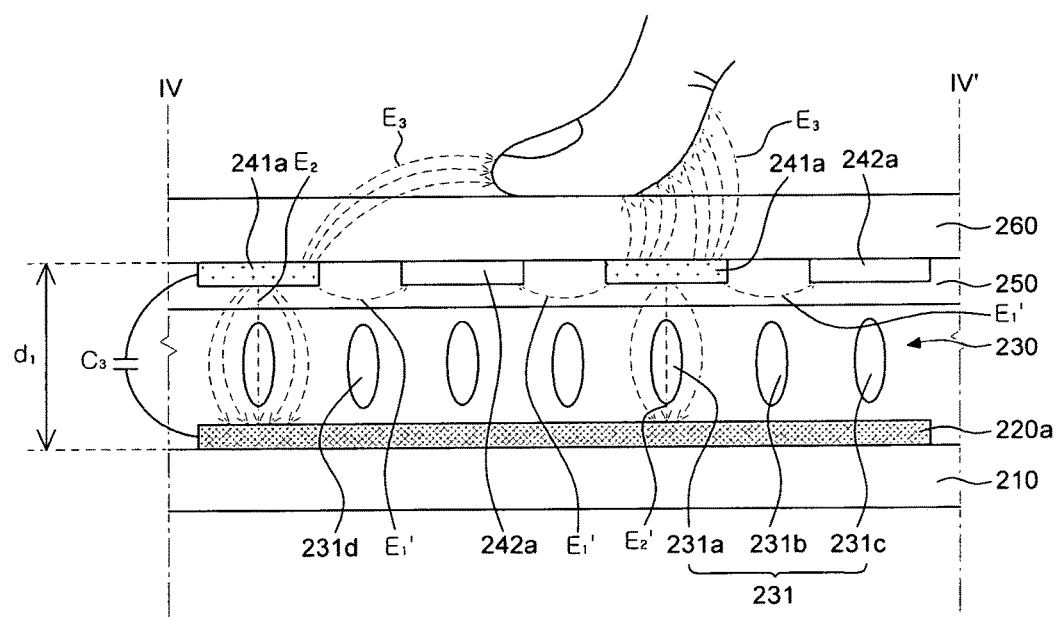
FIG. 4D is a schematic cross-sectional view of the touch panel describing the arrangement direction of the anisotropic dielectric material when a strong touch input is applied.

FIG. 4A is a schematic cross-sectional view of the touch panel taken along line IV-IV' of FIG. 2C. FIG. 4B is a schematic cross-sectional view of the touch panel describing an arrangement direction of an anisotropic dielectric material when driving voltage is applied. FIG. 4C is a schematic cross-sectional view of the touch panel describing the arrangement direction of the anisotropic dielectric material when a weak touch input is applied. FIG. 4D is a schematic cross-sectional view of the touch panel for describing the arrangement direction of the anisotropic dielectric material when a strong touch input is applied.

First, referring to FIG. 4A, the pattern electrode 220a of the lower electrode 220 overlaps with the first sub electrodes 241a of two first electrodes 241 and overlaps with the second sub electrodes 242a of two second electrodes 242. The liquid crystal (that is, the anisotropic dielectric material) 231 is disposed between the upper electrode 240 and the lower electrode 220 and initially arranged in the vertical direction. Therefore, when the touch panel 200 does not operate, the liquid crystals 231 are all arranged in the vertical direction. However, the initial arrangement direction of the liquid crystals 231 is not limited thereto and the liquid crystals 231 may be initially arranged in the horizontal direction.

The relative permittivity of the dielectric layer 230 is determined depending on the arrangement directions of the liquid crystals 231. That is, since a vertical relative permittivity $\varepsilon_1$ and a horizontal relative permittivity $\varepsilon_2$ of the liquid crystals 231 are different from each other, the relative permittivity of the dielectric layer 230 may vary depending on whether the arrangement direction of the liquid crystals 231 is the vertical direction or the horizontal direction. When the liquid crystals 231 are positive type liquid crystals, the vertical relative permittivity $\varepsilon_1$ is larger than the horizontal relative permittivity $\varepsilon_2$. On the contrary, when the liquid crystals 231 are negative type liquid crystals, the horizontal relative permittivity $\varepsilon_2$ may be larger than the vertical relative permittivity $\varepsilon_1$. Hereinafter, it is described that the liquid crystals 231 are the positive type liquid crystals.

Referring to FIG. 4B, the first voltage is applied to the first electrode 241, the second voltage is applied to the second electrode 242, and the third voltage is applied to the lower electrode 220. Herein, the second voltage is different from the first voltage and the third voltage is different from the first voltage. Therefore, a vertical electric field $E_2$ is formed between the first sub electrode 241a of the first electrode 241 and the pattern electrode 220a of the lower electrode 220 and a horizontal electric field $E_1$ is formed between the first sub electrode 241a of the first electrode 241 and the second sub electrode 242a of the second electrode 242. On the contrary, the second voltage and the third voltage are the same voltage as each other. In this case, the electric field is not formed between the second sub electrode 242a and the pattern electrode 220a. For example, when the first voltage is applied to the first electrode 241 and both the second electrode 242 and the lower electrode 220 are grounded, the vertical electric field $E_2$ is formed on the pattern electrode 220a from the first sub electrode 241a and the horizontal electric field $E_1$ is formed on the second sub electrode 242a from the first sub electrode 241a. Hereinafter, a case in which the second sub electrode 242a and the pattern electrode 220a are grounded will be assumed and described.

As described above, when the liquid crystals 231 are the positive type liquid crystals, since the liquid crystals 231 are arranged in a direction parallel to an electric field direction, liquid crystals 231b influenced by the horizontal electric field $E_1$ are arranged in the horizontal direction. Further, liquid crystals 231a influenced by the vertical electric field $E_2$ are arranged in the vertical direction. That is, since the liquid crystals 231b disposed between the first sub electrode 241a and the second sub electrode 242a are influenced by the horizontal electric field $E_1$, the liquid crystals 231b are arranged in the horizontal direction and since the liquid crystals 231a disposed between the first sub electrode 241a and the pattern electrode 220a are influenced by the vertical electric field $E_2$, the liquid crystals 231a are arranged in the vertical direction. Meanwhile, since both the second sub electrode 242a and the pattern electrode 220a are grounded to have no potential difference, the electric field is not generated between the second sub electrode 242a and the pattern electrode 220a. Also, since liquid crystals 231c disposed between the second sub electrode 242a and the pattern electrode 220a are not influenced by the electric field, the liquid crystals 231c may maintain an initial vertical arrangement state. In some exemplary embodiments, when the liquid crystals 231 are negative type liquid crystals, the arrangement direction of the liquid crystals 231 may be determined to be opposite to that of the positive type liquid crystals.

In this case, a capacitance $C_1$ between the first sub electrode 241a and the pattern electrode 220a may be determined by the relative permittivity of the dielectric layer 230. That is, a capacitance of a capacitor may be expressed by [Equation 1] given below.

$$C = \varepsilon \varepsilon_0 \frac{A}{d} \qquad \text{Equation 1}$$

(C: the capacitance of the capacitor, $\varepsilon$: the relative permittivity of the dielectric layer, $\varepsilon_0$: a permittivity of vacuum, A: areas of both electrodes of the capacitor, d: a gap between both electrodes of the capacitor)

As mentioned above, since the relative permittivity of the liquid crystals 231 varies depending on the arrangement direction of the liquid crystals 231, the capacitance $C_1$ between the first sub electrode 241a and the pattern electrode 220a may be determined by the number of vertically arranged liquid crystals 231a and 231c and the number of horizontally arranged liquid crystals 231b.

Meanwhile, in FIGS. 4A to 4D, the pattern electrode 220a overlaps with two first sub electrodes 241a and as mentioned above, the first sub electrodes 241a are electrically connected to each other through the first connection electrode 243. Therefore, the capacitance $C_1$ between the first sub electrode 241a and the pattern electrode 220a means the capacitance $C_1$ between two first sub electrodes 241a which overlap with the pattern electrode 220a and the pattern electrode 220a.

Referring to FIG. 4C, when the touch input is applied, the arrangement of the liquid crystals is changed. In detail, since a finger of the person is in an electrical ground state, a partial electric field $E_3$ is generated to the finger of the user from the first sub electrode 241a at a point to which the touch input is applied. Therefore, the intensities of a horizontal electric field $E_1'$ and a vertical electric field $E_2'$ of the first sub electrode 241a adjacent to the point to which the touch input is applied may decrease. As the intensity of the horizontal electric field $E_1'$ decreases, the arrangement direction of the liquid crystals 231 around the first sub electrode 241a adjacent to the point to which the touch input is applied may return to the initial vertical direction. In this case, as the arrangement direction of some liquid crystals 231 returns to the vertical direction, the relative permittivity of the dielectric layer 230 is changed. Therefore, a capacitance $C_2$ between two first sub electrodes 241a which overlap with the pattern electrode 220a and the pattern electrode 220a may be different from the capacitance $C_1$ in FIG. 4B before the touch input is applied.

Meanwhile, as illustrated in FIG. 4C, when the touch input is weakly applied, since a contact area of the upper substrate 260 and the finger is small, the electric field $E_3$ is generated only between the first sub electrode 241a most adjacent to the finger and the finger. In addition, the electric field is not generated between the first sub electrode 241a relatively distant from the finger and the finger. Therefore, the arrangement direction of the liquid crystals 231b around the first sub electrode 241a most adjacent to the finger are changed to the vertical direction, but the liquid crystals 231d around the first sub electrode 241a relatively distant from the finger may still be arranged in the horizontal direction.

Referring to FIG. 4D, when the touch input is applied and thereafter, the touch pressure increases or the strong touch input is applied, the contact area of the finger and the upper substrate 260 may be larger than the contact area illustrated in FIG. 4B. As a result, the number of first sub electrodes 241a forming the electric field $E_3$ together with the finger may increase. Therefore, as illustrated in FIG. 4D, both the horizontal electric field $E_1'$ of the first sub electrode 241a most adjacent to the finger and the horizontal electric field $E_1'$ of another first sub electrode 241a relatively distant from the finger may decrease. Therefore, the horizontal arrangement direction of the liquid crystals 231d which is arranged horizontal direction when the weak touch input is applied may return to the vertical direction according as the strong touch input is applied to the horizontally arranged liquid crystals 231d. Accordingly, as the horizontal electric field $E_1'$ decreases, the number of vertically arranged liquid crystals 231 may increase, and as a result, the relative permittivity of the dielectric layer 230 is changed. That is, when FIGS. 4C and 4D are compared with each other, the number of liquid crystals 232 arranged in the vertical direction during the weak touch input is larger than the number of liquid crystals 231 arranged in the vertical direction during the strong touch input. Thus, the relative permittivity of the dielectric layer 230 is changed. Therefore, a capacitance $C_3$ between two first sub electrodes 241a which overlap with the pattern electrode 220a and the pattern electrode 220a may be different from the capacitance $C_2$ when the weak touch input is applied.

The touch force detecting unit 282 of the touch controller 280 senses the capacitance change between the pattern electrode 220a and the first sub electrode 241a to detect the force of the touch input. In detail, the touch force detecting unit 282 stores as a reference capacitance of the capacitance (C1) between the pattern electrode 220a and the first sub electrode 241a before the touch input is applied.

When the touch is applied, since the arrangement direction of some liquid crystals 231 among the liquid crystals 231 disposed on the pattern electrode 220a returns to the vertical direction, the relative permittivity of the dielectric layer 230 is changed. In the case of the positive type liquid crystals, the relative permittivity $\varepsilon_1$ of the liquid crystals 231 arranged in the vertical direction is larger than the relative permittivity $\varepsilon_2$ of the liquid crystals 232 arranged in the horizontal direction. Therefore, when the touch input is applied, as the number of liquid crystals 231 arranged in the vertical direction increases, the capacitance (C2) between the pattern electrode 220a and the first sub electrode 241a increases. The touch force detecting unit 282 calculates the force of the touch input from a deviation between the capacitance (C2) between the pattern electrode 220a and the first sub electrode 241a and the reference capacitance (C1).

When the force of the touch input increases, the contact area of the finger increases and as the contact area of the finger increases, the number of liquid crystals 231 arranged in the vertical direction further increases. Therefore, the relative permittivity of the dielectric layer 230 further increases. Accordingly, the capacitance (C3) between the pattern electrode 220a and the first sub electrode 241a may exhibit a larger deviation from the reference capacitance (C1). The touch force detecting unit 282 calculates the force of the touch input from the capacitance deviation. In this case, the force of the touch input, which is calculated in FIG. 4D is larger than the force of the touch input, which is calculated in FIG. 4C.

A maximum relative permittivity and a minimum relative permittivity of the liquid crystals 231 need to have a deviation of a predetermined value or more so that the touch force detecting unit 282 easily calculates the force of the touch input. In the case of the positive type liquid crystals, the vertical relative permittivity $\varepsilon_1$ is the maximum relative permittivity and the horizontal relative permittivity $\varepsilon_2$ may be the minimum relative permittivity. Therefore, the vertical relative permittivity $\varepsilon_1$ and the horizontal relative permittivity $\varepsilon_2$ have a deviation of a predetermined value or more. For example, the deviation between the vertical relative permittivity $\varepsilon_1$ and the horizontal relative permittivity $\varepsilon_2$ may be 2 or more. As mentioned above, since the relative permittivity represents the ratio of the permittivity of the medium and the permittivity of the vacuum, there is no unit of the relative permittivity. When the difference between the relative permittivity $\varepsilon_1$ of the vertically arranged liquid crystals 231 and the relative permittivity $\varepsilon_2$ of the horizontally arranged liquid crystals 232 is smaller than 2, a change of the relative permittivity of the dielectric layer 230 depending on the arrangement direction of the liquid crystals is too small. Therefore, the capacitance deviation between the upper electrode 240 and the lower electrode 220 may decrease. As a result, the touch force detecting unit 282 may detect the force of the touch input. Meanwhile, a maximum value of the deviation between the maximum relative permittivity and the minimum relative permittivity is not particularly limited. That is, as the permittivity deviation of the anisotropic dielectric material increases, the relative permittivity of the dielectric layer 230 varies in a larger range and the force of the touch input may be more accurately measured. Therefore, as the relative permittivity deviation of the anisotropic dielectric material is larger, it is more advantageous.

Meanwhile, as illustrated in FIGS. 4A to 4D, even though the force of the touch input increases, a gap d1 between the upper substrate 260 and the lower substrate 210 is constantly maintained. That is, the touch panel 200 according to the exemplary embodiment of the present disclosure measures the force of the touch input based on the relative permittivity of the dielectric layer 230 which varies depending on the arrangement direction of the anisotropic dielectric material. Therefore, the force of the touch input may be measured regardless of the change in thickness of the dielectric layer 230. Still, when the thickness of the dielectric layer 230 is changed, the capacitance between the upper electrode 240 and the lower electrode 220 may be changed due to the change in thickness of the dielectric layer 230 and the force of the touch input may not accurately be measured. Therefore, the thickness of the dielectric layer 230 needs to be constantly maintained regardless of the presence of the touch input. The touch panel 200 according to the exemplary embodiment of the present disclosure may include the upper substrate 260 and the lower substrate 210 having excellent rigidity in order to constantly maintain the thickness of the dielectric layer 230.

As mentioned above, since the pattern electrode 220a of the lower electrode 220 has a predetermined area corresponding to one finger knuckle of the person, the force of the touch input may be more accurately measured. When the lower electrode 220 is formed to cover a whole surface of the lower substrate 210, the capacitance between the lower electrode 220 and the first sub electrode 241a may be influenced even by the arrangement direction of liquid crystals 231 disposed in another area to which the touch input is not applied. As a result, the capacitance of the area to which the touch input is applied may not precisely be measured. On the contrary, when the lower electrode 220 is patterned, an amount of change in capacitance for a specific region may be more accurately measured through the pattern electrode 220a. In particular, it is more advantageous in that the amount of change in capacitance may be more precisely measured than the case where the pattern electrode 220a has the area corresponding to one finger knuckle of the person.

Further, the touch coordinate detecting unit 281 of the touch controller 280 senses the change in horizontal electric field $E_2$ between the first sub electrode 241a and the second sub electrode 242a to detect the coordinates of the touch input. For example, the touch coordinate detecting unit 281 may detect the touch coordinates by a self-capacitive type or a mutual-capacitive type. As the exemplary embodiment, the mutual-capacitive type as a touch coordinate detecting method will be described with reference to FIGS. 4B and 4C.

In FIGS. 4B and 4C, when the first voltage is applied to the first electrode 241 and the second electrode is grounded, the first electrode 241 may serve as a driving electrode and the second electrode 242 may serve as a sensing electrode. When the touch input is applied, since the electric field $E_3$ is formed between the first sub electrode 241a and the finger, the horizontal electric field $E_2'$ between the first sub electrode 241a and the second sub electrode 242a may be weak. As a result, a mutual capacitance between the first sub electrode 241a and the second sub electrode 242a may be changed. The touch coordinate detecting unit 281 senses the change of the touch signal depending on the change of the mutual capacitance through the second electrode 242 to detect the coordinates of the touch input.

Meanwhile, the touch coordinate detecting unit 281 detects the touch coordinates based on the weak touch input to detect accurate touch coordinates. The strong touch input accompanies the weak touch input. That is, the finger of the user weakly touches the upper substrate 260 and thereafter, the pressure is applied to the upper substrate 260. As a result, an operation of increasing the force of the touch input is performed. Therefore, the weak touch input is first accompanied before the strong touch input is applied. The touch coordinate detecting unit 281 senses the mutual capacitance change between the first electrode 241 and the second electrode 242 at the moment when the finger of the user first touches the upper substrate 260 to detect the coordinates of the touch input.

FIGS. 5A and 5B are schematic views for comparing and describing X-Y-axis touch sensitivities of a general capacitive type touch panel and the touch panel according to the exemplary embodiment of the present disclosure.

FIG. 5A as a compared example is a schematic view illustrating the X-Y-axis touch sensitivity of the general capacitive type touch panel. Data of FIG. 5 is measured by using a general mutual capacitive type touch panel. The touch panel of FIG. 5A is the same as the touch panel 200 according to the exemplary embodiment of the present disclosure, which is illustrated in FIGS. 2 to 4D except the dielectric layer 230 having the anisotropic dielectric material and the lower electrode 220 are omitted. That is, the general capacitive type touch panel includes the first electrode and the second electrode which cross each other and each of the first electrode and the second electrode includes a plurality of first sub electrodes and second sub electrodes having an electrode surface with a specific shape. The first sub electrode and the second sub electrode are disposed in the matrix pattern and points where the first sub electrodes and the second sub electrodes cross each other may be recognized as respective touch coordinates. In FIG. 5A, a rectangular cell means the respective touch coordinates and number in a rectangle is a digital data value acquired by converting the amount of change in mutual capacitance between the first sub electrode and the second sub electrode in the respective touch coordinates. That is, as the number in the rectangle is larger, the amount of change in mutual capacitance between the first sub electrode and the second sub electrode at the corresponding point is larger. In FIG. 5A, the touch input is applied to the center of the touch panel.

FIG. 5B as an exemplary embodiment is a schematic view illustrating the X-Y-axis touch sensitivity of the touch panel 200 according to an exemplary embodiment of the present disclosure. Data of FIG. 5B is measured by using the touch panel 200 according to the exemplary embodiment of the present disclosure, which is illustrated in FIGS. 2 to 4D. The touch panel 200 of FIG. 5B is formed similarly to the touch panel of FIG. 5A except the touch panel 200 of FIG. 5B further includes the dielectric layer 230 and the lower electrode 220. That is, the touch panel 200 of FIG. 5B has the same area as the touch panel of FIG. 5A and includes first sub electrodes 241a and second sub electrodes 242a of the same number. The touch input in the touch panel 200 of FIG. 5B is applied to the center similarly to the touch panel of FIG. 5A.

Referring to FIG. 5A, the digital data value at the center to which the touch input is applied in the touch panel according to the comparative example is measured as 531. That is, the digital data value at the point to which the touch input is applied is measured to be larger than a digital data value at a point to which the touch input is not applied by approximately 200 or more.

Referring to FIG. 5B, the digital data value at the center to which the touch input is applied in the touch panel 200 according to the exemplary embodiment of the present disclosure is measured as 522. That is, the digital data value at the point to which the touch input is applied is measured to be larger than the digital data value at a point to which the touch input is not applied by approximately 200 or more.

As known with reference to FIGS. 5A and 5B, the touch panel 200 according to the exemplary embodiment of the present disclosure may perform X-Y-axis touch sensing with almost equivalent sensitivity to the general mutual capacitive type touch panel. That is, in the touch panel 200 according to the exemplary embodiment of the present disclosure, the mutual capacitance is sufficiently changed at the point to which the touch input is applied and the touch controller may accurately detect the coordinates of the touch input by sensing the mutual capacitance change.

Figure 6:
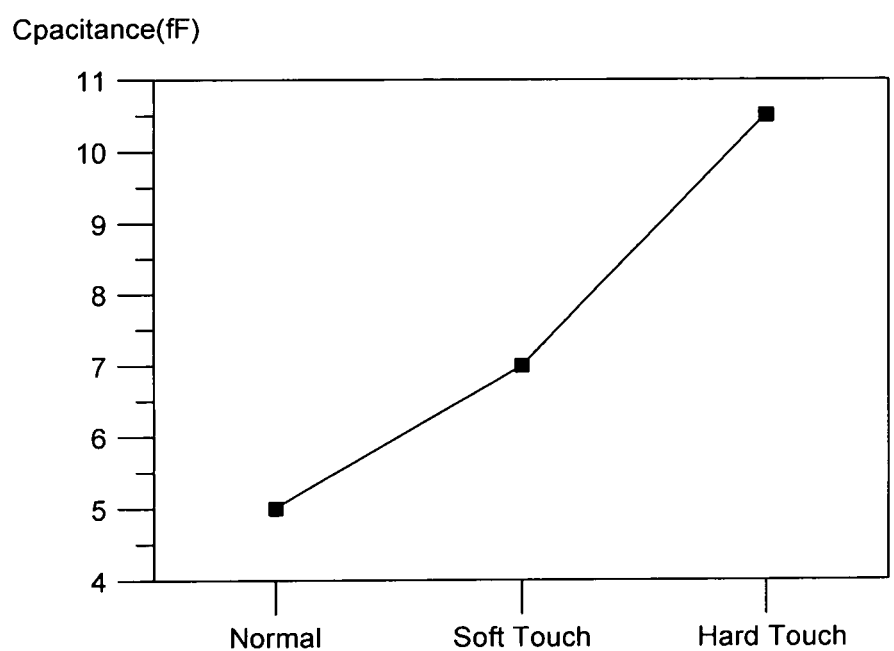
FIG. 6 is a graph describing Z-axis touch sensitivity of the touch panel according to the exemplary embodiment of the present disclosure.

FIG. 6 is a graph describing Z-axis touch sensitivity of the touch panel according to the exemplary embodiment of the present disclosure.

Referring to FIG. 6, it may be known that the touch panel 200 according to the exemplary embodiment of the present disclosure may perform the touch sensing of the 2D coordinates and measure even the force of the touch input. In FIG. 6, the touch panel 200 includes the positive type liquid crystals as the anisotropic dielectric material and a difference between the vertical relative permittivity $\varepsilon_2$ and the horizontal relative permittivity $\varepsilon_1$ of the positive type liquid crystals is 4. The liquid crystals 231 are initially arranged in the vertical direction. When the touch input is not applied (Normal), some liquid crystals 231b are arranged in the horizontal direction by the horizontal electric field $E_1$ between the first sub electrode 241a and the second sub electrode 242a as illustrated in FIG. 4B. In this case, the capacitance $C_1$ between the pattern electrode 220a and the first sub electrode 241a is measured as approximately 5 fF. When the weak touch input is applied (soft touch), the horizontal electric field $E_2'$ between the first sub electrode 241a and the second sub electrode 242a in the part to which the touch is applied may decrease and the arrangement direction of some liquid crystals 231b on the pattern electrode 220a may return to the vertical direction. Therefore, the capacitance $C_2$ between the pattern electrode 220a and the first sub electrode 241a may be changed. In this case, the capacitance $C_2$ between the pattern electrode 220a and the first sub electrode 241a is measured as approximately 7 fF. When the strong touch input is applied (hard touch), since the number of vertically arranged liquid crystals 231 increases while the contact area of the finger increases, the capacitance between the pattern electrode 220a and the first sub electrode 241a may be more largely changed as illustrated in FIG. 4D. In this case, the capacitance $C_3$ between the pattern electrode 220a and the first sub electrode 241a is measured as approximately 10.5 fF.

The touch force detecting unit 282 stores the capacitance $C_1$ when the touch input is not applied (normal) as a reference capacitance in the memory. The touch force detecting unit 282 calculates the force of the touch input by comparing the capacitance $C_2$ when the weak touch input is applied (soft touch) with the reference capacitance $C_1$ and calculates the force of the touch input by comparing the capacitance $C_3$ when the strong touch input is applied (hard touch) with the reference capacitance $C_1$. In some embodiments, the touch force detecting unit 282 may store the capacitance $C_1$ when the touch input is not applied (normal), the capacitance $C_2$ when the weak touch input is applied (soft touch), and the capacitance $C_3$ when the strong touch input is applied (hard touch) in a look up table (LUT) format, respectively. In this case, the touch force detecting unit 282 may be constituted to immediately detect the force of the touch input by comparing the measured capacitance with the capacitance data stored in the LUT.

The touch panel 200 according to the embodiment of the present disclosure detects a coordinate of the touch input by sensing a change in electric field between the first electrode 241 and the second electrode 242. In addition, the touch panel 200 detects the force of the touch input by sensing a change in relative permittivity of the dielectric layer 230 between the upper electrode 240 and the lower electrode 220. Accordingly, the touch panel 200 according to the embodiment of the present disclosure may sense a 3D touch by measuring the force of the touch input as well as a 2D X-Y coordinate of the touch input.

Further, the touch panel 200 according to the embodiment of the present disclosure measures the force of the touch input based on the change in relative permittivity according to an arrangement direction of a dielectric anisotropic material. Accordingly, the touch panel 200 may measure the force of the touch input regardless of the thickness of the dielectric layer 230. That is, a distance $d_1$ between the upper substrate 260 and the lower substrate 210 may be uniformly maintained regardless of the force of the touch input. As the thickness of the dielectric layer 230 is equally maintained, the touch panel 200 may have various advantages as compared with a capacitive type pressure sensor in the related art. That is, since there is no change in thickness of the dielectric layer 230, the thickness of the dielectric layer 230 needs not to be restored. A change in speed of the dielectric anisotropic material is faster than a restoring speed of the thickness of the dielectric layer 230. As a result, even though the continuous touch input is applied, the touch panel 200 may accurately and rapidly sense the touch input. Further, since the change in thickness of the dielectric layer 230 is not required, the dielectric layer 230 may be formed with a sufficiently small thickness and the display panel 200 may be thinner.

Figure 7:
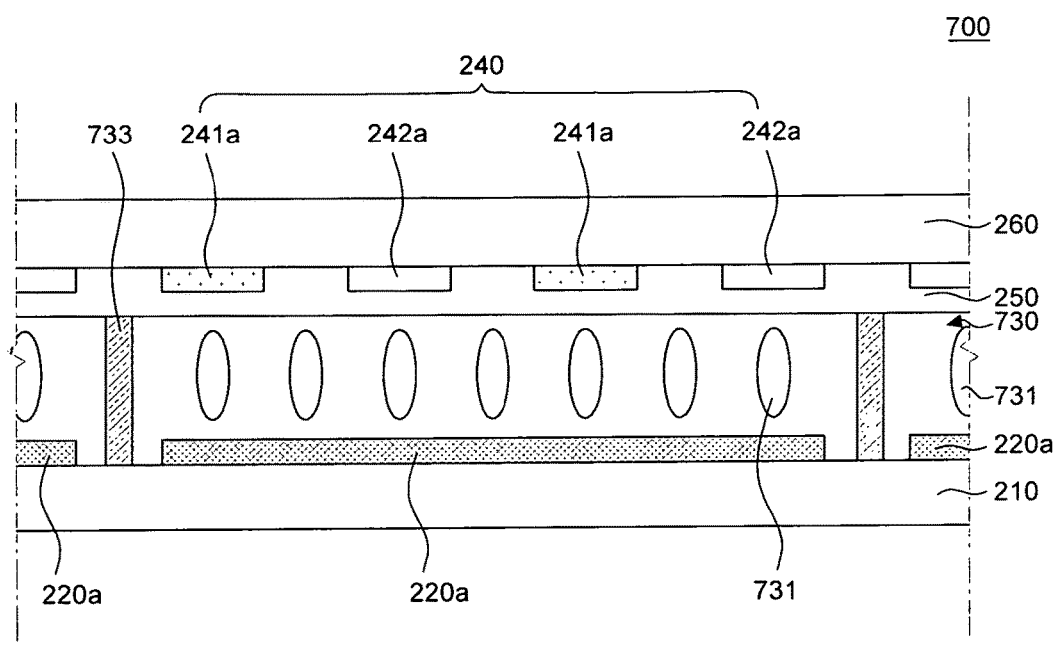
FIG. 7 is a schematic cross-sectional view describing a touch panel according to another exemplary embodiment of the present disclosure.

FIG. 7 is a schematic cross-sectional view for describing a touch panel according to another embodiment of the present disclosure. A touch panel 700 illustrated in FIG. 7 is substantially the same as the touch panel 200 illustrated in FIGS. 2A to 3 except that a liquid crystal 731 of a dielectric layer 730 is divided by a partition wall 733 as compared with the touch panel 200 illustrated in FIGS. 2A to 3. Accordingly, the duplicated description thereof will be omitted. Referring to FIG. 7, the dielectric layer 730 includes the liquid crystal 731 and the partition wall 733.

Referring to FIG. 7, the partition wall 733 is disposed between the upper substrate 260 and the lower substrate 210. The partition wall 733 maintains the distance between the upper substrate 260 and the lower substrate 210, and the dielectric layer 730 may maintain substantially the same thickness by the partition wall 733.

Referring to Equation 1, a capacitance between a first sub electrode 241a and a pattern electrode 220a is influenced by the thickness of the dielectric layer 730 as well as the relative permittivity of the dielectric layer 730. Even though the upper substrate 260 and the lower substrate 210 are formed of materials having excellent rigidity, the distance between the upper substrate 260 and the lower substrate 210 may also be minutely changed by the strong touch input. In this case, since the distance between the first sub electrode 241a and the pattern electrode 220a is equally changed, the capacitance between the first sub electrode 241a and the pattern electrode 220a may be minutely changed.

The partition wall 733 uniformly maintains the distance between the upper substrate 260 and the lower substrate 210 between the upper substrate 260 and the lower substrate 210 and may minimize the change in thickness of the dielectric layer 730. As a result, the capacitance between the first sub electrode 241a and the pattern electrode 220a may be changed based on only the arrangement of the liquid crystal 731, and the force of the touch input may be more precisely measured.

Further, the partition wall 733 surrounds the pattern electrode 220a of the lower electrode 220. That is, the partition wall 733 is disposed along the outside of each of a plurality of pattern electrodes 220a constituting the lower electrode 220. The partition wall 733 separates the pattern electrode 220a and the liquid crystal 731 disposed on the pattern electrode 220a from each other. Accordingly, the pattern electrodes 220a are isolated from each other by the partition wall 733, and the liquid crystals 731 disposed on the pattern electrode 220a are isolated from each other by the partition wall 733.

The partition wall 733 isolates the liquid crystal 731 on a specific pattern electrode 220a and the liquid crystal 731 on another pattern electrode 220a from each other. As a result, interference on the liquid crystal 731 in another region except for the region where the touch input is applied may be minimized. In detail, as described above, a change in capacitance between the pattern electrode 220a and the first sub electrode 241a is determined by the arrangement direction of the liquid crystal 731 disposed on the pattern electrode 220a. The liquid crystals 731 need to be isolated from each other so as not to change the arrangement of the liquid crystals 731 except for the portion where the touch input is applied.

When the distance between the upper substrate 260 and the lower substrate 210 is changed, the arrangement of the liquid crystal 731 of the dielectric layer 730 may be influenced. For example, while the strong touch input is applied, local pressure may be applied to a predetermined region of the upper substrate 260. When the pressure is applied, the arrangement of the liquid crystal 731 on the pattern electrode 220a in the region where the touch input is applied is changed. In addition, while the distance between the upper substrate 260 and the lower substrate 210 is minutely reduced by the pressure, the arrangement of the liquid crystal 731 on another pattern electrode 220a which is adjacent to the region where the touch input is applied may be minutely changed. Accordingly, the capacitance between another pattern electrode 220a and the first sub electrode 241a may be minutely changed. However, when the partition walls 733 are disposed, the liquid crystals 731 may be isolated from each other by the partition walls 733 for each region where the pattern electrode 220a is disposed. As a result, the interference on the liquid crystals 731 disposed in another region except for the region where the touch input is applied may be minimized.

The partition wall 733 may be made of transparent polymers. In this case, when the touch panel 700 is applied to the display device, reduction in visibility by the partition wall 733 may be minimized. However, the material of the partition wall 733 is not limited thereto, and the partition wall 733 may be formed of various materials having an optical characteristic without reducing the visibility of the display device.

As a result, the touch panel 700 according to another embodiment of the present disclosure further includes the partition wall 733 which uniformly maintains the distance between the upper substrate 260 and the lower substrate 210 to uniformly maintain the distance of the dielectric layer 730. Accordingly, the change in capacitance between the first sub electrode 241a and the pattern electrode 220a may be generated depending on only the arrangement of the liquid crystal 731, and the force of the touch input may be precisely measured. Further, the partition wall 733 separates the liquid crystal 731 on the pattern electrode 220a from the liquid crystal 731 on another pattern electrode 220a. As a result, a change in arrangement of the liquid crystal 731 on the adjacent pattern electrode 220a may be minimized by locally applying strong pressure.

Figure 8:
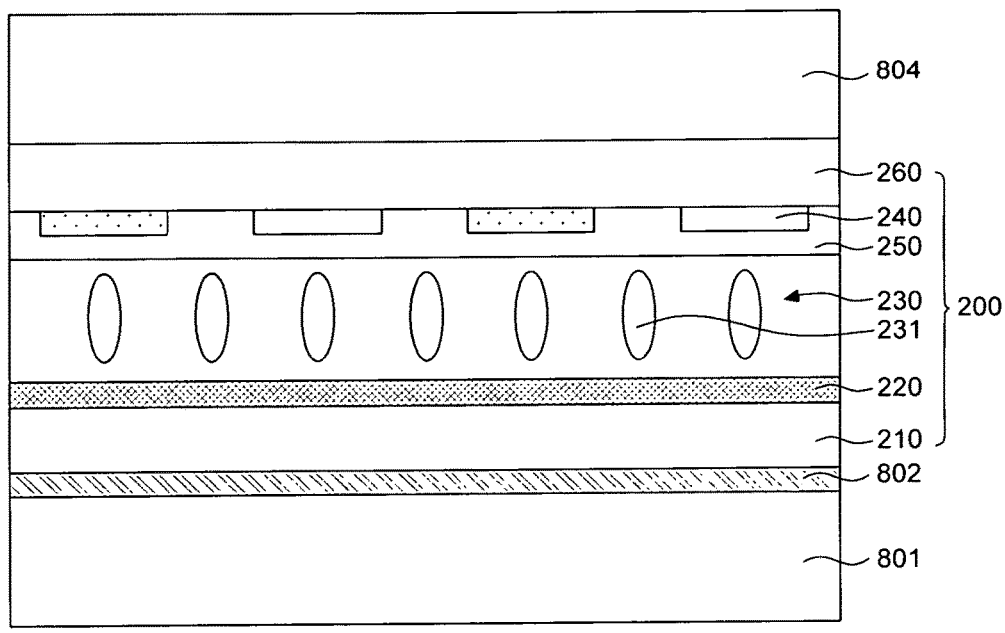
FIG. 8 is a schematic cross-sectional view describing a display device according to an exemplary embodiment of the present disclosure.

FIG. 8 is a schematic cross-sectional view for describing a display device according to an embodiment of the present disclosure. Since a display device 800 illustrated in FIG. 8 includes the touch panel 200 illustrated in FIGS. 2A to 3, the duplicated description for the touch panel 200 will be omitted.

Referring to FIG. 8, the display device 800 includes a display panel 801, a polarizer 802 disposed on the display panel 801, a touch panel 200, a transparent adhesive layer 803 disposed on the touch panel 200, and a cover glass 804 disposed on the transparent adhesive layer 803.

The display panel 801 includes a plurality of pixels for implementing an image, and a kind of display device 800 may be determined according to a kind of element constituting the pixels. When the display device 800 is constituted as an organic light emitting display device, the respective pixels may include at least one organic light emission element and at least one thin film transistor. However, the kind of display device 800 is not limited thereto, and the display device 800 may also be implemented by a liquid crystal display, an electrophoretic display device, and the like.

The display panel 801 includes a display area and a non-display area. The display area means an area in which pixels are disposed to implement an image and may also be referred to as an active area or a pixel area. The non-display area means the remaining area surrounding the display area and means an area in which various kinds of wires connected with the pixels are disposed. The upper electrode 240 and the lower electrode 220 of the touch panel 200 may be disposed to correspond to the display area of the display panel 801. The user may apply various pressures to the display device 800 by directly applying the touch input to the display area of the display panel 801 in which the image is displayed.

The polarizer 802 transmits or absorbs only light in a predetermined polarization state of light emitted from the display panel 801 and suppresses reflection of light input from the outside of the display device 800.

The polarizer 802 is disposed between the display panel 801 and the touch panel 200. When the polarizer 802 is disposed on the touch panel 200, the light emitted from the display panel 801 passes through the dielectric layer 230 of the touch panel 200 and thus, the optical characteristic may be changed. That is, since the liquid crystal 231 of the dielectric layer 230 has optical refractive index anisotropy, the optical characteristic of the light emitted from the display panel 801 may be changed while passing through the liquid crystal 231. As a result, the visibility of the display device 800 may be reduced. However, like the display device 800 according to the embodiment of the present disclosure, the polarizer 802 is disposed between the display panel 801 and the touch panel 200. In this case, the light emitted from the display panel 801 is emitted as the light having the predetermined polarization state, and thus, the change in optical characteristic generated while passing through the liquid crystal 231 may be minimized.

Although not illustrated in FIG. 8, the display device 800 may further include a printed circuit board. On the printed circuit board, a touch controller for detecting the coordinate of the touch input and the force of the touch input based on a touch signal of the touch panel 200 may be disposed. The touch controller includes a touch input detecting unit for detecting the coordinate of the touch input and a touch force detecting unit for detecting the force of the touch input.

In some embodiments, the display device 800 may further include a tactile feedback element. The tactile feedback element may generate various tactile feedbacks in response to the user's touch input on the touch panel 200. For example, the tactile feedback element may be implemented by eccentric rotating mass (ERM), piezo ceramic, electro-active polymers (EAPs), and the like, but is not limited thereto. When the display device 800 includes the tactile feedback element, the display device 800 may not only sense the user's touch input but also provide an emotional haptic effect to the user.

The display device 800 according to the embodiment of the present disclosure includes the touch panel 200 having the upper electrode 240, the lower electrode 220, and the dielectric layer 230 made of a dielectric anisotropic material. The touch panel 200 senses a change in capacitance between the upper electrode 240 and the lower electrode 220 based on a relative permittivity of the dielectric layer 230 which is changed in an arrangement direction of the dielectric anisotropic material. As a result, the force of the touch input is detected. That is, the display device 800 according to the embodiment of the present disclosure may sense the force of the touch input as well as the 2D coordinate of the touch input. Accordingly, the display device 800 according to the embodiment of the present disclosure may sense various user's touch inputs.

Further, the force of the touch input is sensed based on the change in relative permittivity of the dielectric layer 230 between the upper electrode 240 and the lower electrode 220, and thus, the touch input may be sensed even without the change in thickness of the dielectric layer 230. As a result, a disadvantage of a capacitive type pressure sensor in the related art due to the change in thickness may be compensated. That is, since there is no change in thickness of the dielectric layer 230, a problem that the continuous touch input on the dielectric layer 230 is not recognized may be solved. Since the thickness of the dielectric layer 230 may be decreased, the thickness of the display device 800 may be decreased as well.

Figure 9A:
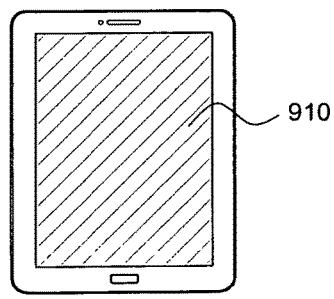
FIGS. 9A-9F are diagrams illustrating examples in which the display device can be advantageously used according to various exemplary embodiments of the present disclosure.

FIGS. 9A-9F are diagrams illustrating examples in which display devices according to various embodiments of the present disclosure may be advantageously used. FIG. 9A illustrates a case where a display device 910 according to an embodiment of the present disclosure is used in a mobile device 900. FIG. 9A illustrates that the display device 910 according to the embodiment of the present disclosure is included in the mobile device 900. Here, the mobile device 900 means a compact device such as a smart phone, a portable phone, a tablet PC, and a personal digital assistant (PDA). When the display device 910 is installed in the mobile device 900, the user directly applies the touch input on the screen of the display device 910 to perform various functions of the mobile device 900. Particularly, the touch panel according to the embodiment of the present disclosure may sense the force of the touch input as well as a coordinate of the touch input. As a result, the touch panel may be constituted to perform different functions according to the force of the touch input, and convenience of the user's operation for the mobile device 900 may be improved.

Figure 9B:
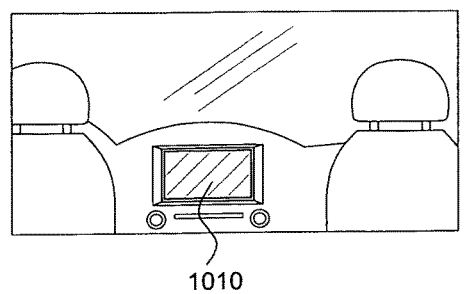

FIG. 9B illustrates a case where a display device according to an embodiment of the present disclosure is used in a vehicle navigation system 1000. The vehicle navigation system 1000 may include a display device 1010 and a plurality of operating elements and may be controlled by a processor installed in the vehicle. When the display device 1010 is applied to the vehicle navigation system 1000, the user directly touches the screen of the display device 1010 without using a separate input button to use various functions of the vehicle navigation system 1000. In addition, the user may apply various inputs to the vehicle navigation system 1000 by varying the force of the touch input. The vehicle navigation system 1000 may be implemented to provide different information to the user according to the force of the touch input.

Figure 9C:
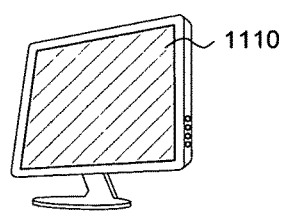

FIG. 9C illustrates a case where a display device according to an embodiment of the present disclosure is used as a display means 1100 such as a monitor and a TV. When the display device 1110 according to the embodiment of the present disclosure is used as the display means 1100, the user directly applies the touch input to the screen of the display device 1110 to perform various functions of the display means 1100. As a result, the user may easily use various kinds of electronic devices and easily control various functions of the display means 1100. For example, when the user applies the touch input by large pressure, the brightness of the display device 1110 may be implemented to be bright. When the user applies the touch input by small pressure, the brightness of the display device 1110 may be implemented to be dark.

Figure 9D:
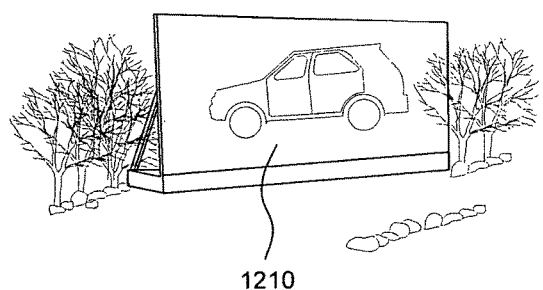

FIG. 9D illustrates a case where a display device according to an embodiment of the present disclosure is used in an outdoor billboard 1200. The outdoor billboard 1200 may include a display device 1210 and a supporter connecting the ground and the display device 1210. When the display device 1210 according to the embodiment of the present disclosure is applied to the outdoor billboard 1200, the user may inquire detailed information of advertisement objects by applying the touch input to the display device 1210 of outdoor billboard 1200. For example, the appearance of the advertisement object may be viewed at various angles through the touch input. Particularly, when the user applied a strong touch input to the display device 1210, the advertisement object may be enlarged. Further, when the user applied a weak touch input to the display device 1210, the advertisement object may be reduced. As a result, the advertisement effect may be maximized.

Figure 9E:
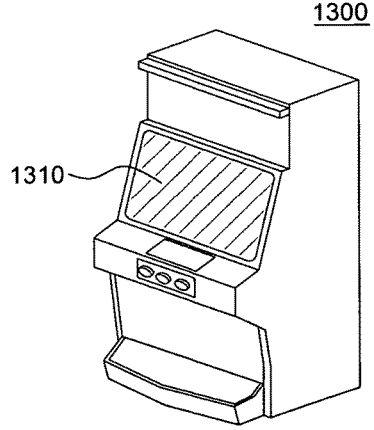

FIG. 9E illustrates a case where display devices according to various embodiments of the present disclosure are used in a game machine 1300. The game machine 1300 may include a display device 1310 and a housing in which various processors are embedded. When the display device 1310 according to the embodiment of the present disclosure is applied to the game machine 1300, the user may realistically operate a game by directly applying the touch input to the display device 1310. The display device 1310 of the game machine 1300 may distinguish the strong touch input and the weak touch input, and thus, a minute game operation is possible.

Figure 9F:
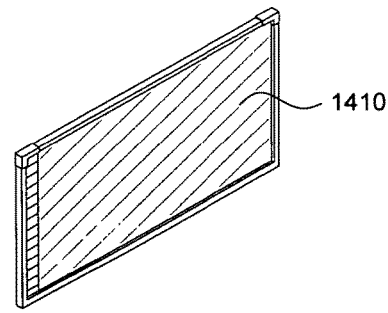

FIG. 9F illustrates a case where a display device according to an embodiment of the present disclosure is used in an electronic whiteboard 1400. The electronic whiteboard 1400 may include a display device 1410, a speaker, and a structure for protecting the display device 1110 and the speaker from external impact. When the display device 1410 according to the embodiment of the present disclosure is applied to the electronic whiteboard 1400, an educator may delivery visual data to an educatee by directly inputting lecture contents on the display device 1400 by a stylus pen or a finger. In this case, the thickness or the color of the character may be changed according to the input force of the stylus pen or the finger of the educator and the educator may emphasize a predetermined portion by changing the force of the touch input. As a result, the education effect may be maximized.

Steps of the method or the algorithm described in association with the embodiments disclosed in the specification may be directly implemented by hardware and software modules executed by the processor, or a combination thereof. The software module may reside in storage media such as a RAM memory, a flash memory, a ROM memory, an EPROM memory, an EEPROM memory, a register, a hard disk, a removable disk, and a CD-ROM or a predetermined storage medium of a difference type known to those skilled in the art. The exemplary storage medium is coupled to the processor and the processor may read information from the storage medium and write the information in the storage medium. As another method, the storage medium may be integrated with the processor. The processor and the storage medium may reside in an application specific integrated circuit (ASIC). The ASIC may reside in a user terminal. As another method, the processor and the storage medium may reside in the user terminal as individual components.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments disclosed in the present disclosure are used to not limit but describe the technical spirit and the scope of the technical spirit of the present disclosure is not limited by the exemplary embodiments. Therefore, the aforementioned exemplary embodiments are all illustrative and are not restricted to a limited form. The scope of the present disclosure may be interpreted by the appended claims and the technical spirit in the equivalent range are intended to be embraced by the disclosure.

What is claimed is:

1. A touch panel, comprising:
a first substrate;
a second substrate facing the first substrate;
a first electrode on one surface of the first substrate;
a second electrode on the surface of the first substrate and spaced apart from the first electrode on a same plane as the first electrode;
a third electrode on one surface of the second substrate and overlapping the first electrode and the second electrode; and
a dielectric layer between the first electrode and the third electrode, and the dielectric layer between the second electrode and the third electrode, and the dielectric layer including an anisotropic dielectric material,
wherein the anisotropic dielectric material between the first electrode and the third electrode is aligned in a first state, and the anisotropic dielectric material between the first electrode and the second electrode is aligned in a second state different from the first state,
wherein when a touch input is applied to the touch panel, an arrangement of the anisotropic dielectric material between the first electrode and the second electrode changes toward the first state.

2. The touch panel according to claim 1, wherein the third electrode includes a plurality of pattern electrodes.

3. The touch panel according to claim 2, wherein:
the first electrode includes a plurality of first sub electrodes,
the second electrode includes a plurality of second sub electrodes, and
the plurality of respective pattern electrodes of the third electrode overlap with at least one first sub electrode among the plurality of first sub electrodes and at least one second sub electrode among the plurality of second sub electrodes.

4. The touch panel according to claim 3, wherein a capacitance between the pattern electrode which overlaps with at least one first sub electrode among the plurality of pattern electrodes and at least one first sub electrode is determined based on the arrangement direction of the anisotropic dielectric material.

5. The touch panel according to claim 3, wherein:
the first electrode and the second electrode extend in different directions from each other, and
the plurality of first sub electrodes are electrically connected to each other through a first connection electrode disposed on a plane different from the first sub electrode and the plurality of second sub electrodes are connected to each other through a second connection electrode disposed on the same plane as the second sub electrode.

6. The touch panel according to claim 3, wherein the touch panel further comprising a plurality of partitions between the first substrate and the second substrate, and wherein the plurality of partitions are along outlines of the plurality of respective pattern electrodes.

7. The touch panel according to claim 1, wherein the anisotropic dielectric material has a non-cubic crystal structure.

8. The touch panel according to claim 7, wherein the anisotropic dielectric material is a liquid crystal.

9. The touch panel according to claim 8, wherein a difference between a maximum relative permittivity and a minimum relative permittivity of the liquid crystal is 2 or more.

10. A display device, comprising:
a display panel;
a touch panel on the display panel; and
a touch controller configured to detect coordinates of a touch input applied to the touch panel and force of the touch input,
wherein the touch panel includes:
a lower electrode;
a dielectric layer on the lower electrode and including an anisotropic dielectric material; and
an upper electrode on the dielectric layer, overlapped with the lower electrode, and including a first electrode and a second electrode spaced apart from each other on a same plane,
wherein the anisotropic dielectric material between the first electrode and the third electrode is aligned in a first state, and the anisotropic dielectric material between the first electrode and the second electrode is aligned in a second state different from the first state, wherein when a touch input is applied to the touch panel, an arrangement of the anisotropic dielectric material between the first electrode and the second electrode changes toward the first state.

11. The display device according to claim 10, wherein:
the first electrode includes a plurality of first sub electrodes,
the second electrode includes a plurality of second sub electrodes, and
the lower electrode includes pattern electrodes which overlap with at least one first sub electrode among the plurality of first sub electrodes and at least one second sub electrode among the plurality of second sub electrodes.

12. The display device according to claim 11, wherein:
the first electrode extends in a first direction,
the second electrode extends in a second direction different from the first direction, and
the first electrode and the second electrode cross each other to be disposed in a matrix pattern.

13. The display device according to claim 12, wherein at least one first sub electrode and at least one second sub electrode which overlap with the pattern electrode are positioned in line with each other.

14. The display device according to claim 10, wherein the touch controller is configured to apply first voltage to the first electrode, apply second voltage different from the first voltage to the second electrode, and apply third voltage different from the first voltage to the lower electrode.

15. The display device according to claim 14, wherein:
the anisotropic dielectric material is a liquid crystal, the arrangement directions of the liquid crystal is determined by an electric field between the first electrode and the second electrode, and
a capacitance between the upper electrode and the lower electrode is determined based on the number of the liquid crystals of which the arrangement direction is changed.

16. The display device according to claim 15, wherein the touch controller includes:
a touch coordinate detecting unit configured to detect coordinates of the touch input by sensing a change of the electric field between the first electrode and the second electrode, and
a touch force detecting unit configured to detect the force of the touch input by sensing the change of the capacitance between the upper electrode and the lower electrode.

17. The display device according to claim 10, further comprising:
a polarizer between the display panel and the touch panel; and
a cover glass on the touch panel.

18. The display device according to claim 16, wherein when the touch input is applied, the touch coordinate detecting unit is configured to detect a capacitance between the first electrode and the second electrode by changing the arrangement of the anisotropic dielectric material between the first electrode and the second electrode and the touch force detecting unit is configured to detect a capacitance between the lower electrode and the first electrode or between the lower electrode and the second electrode.

* * * * *